April 16, 1957 D. W. BODLE ET AL 2,789,254

LIGHTNING PROTECTION CIRCUITS

Filed April 23, 1954 2 Sheets-Sheet 1

INVENTORS: D. W. BODLE
J. B. HAYS, JR.

BY R. B. Ardis

ATTORNEY

LIGHTNING PROTECTION CIRCUITS

Filed April 23, 1954

2 Sheets-Sheet 2

INVENTORS: D. W. BODLE
J. B. HAYS, JR.
BY R. B. Ardis
ATTORNEY 2,789,254
Patented Apr. 16, 1957

2,789,254

LIGHTNING PROTECTION CIRCUITS

David W. Bodle, Morristown, and James B. Hays, Jr., Summit, N. J., assignors to Bell Telephone Laboratories, Incorporated, New York, N. Y., a corporation of New York Application April 23, 1954, Serial No. 425,238

6 Claims. (Cl. 317—61)

This invention relates generally to high voltage protection circuits for use in a telephone system and more particularly to high voltage protection circuits for use in connection with such pieces of apparatus as transistor circuits which are subject to damage even at comparatively low voltage levels.

A principal object of the invention is to protect transistor telephone circuits from damage caused by large voltage surges on the line.

A more particular object is to protect transistor telephone circuits from damage caused by large voltage surges due to lightning striking on or near outdoor telephone lines.

In present telephone systems, it is customary to provide protective apparatus between transmission lines and items of equipment which may be subject to damage by unusually high line voltages. In particular, such apparatus is provided to avoid damage which might otherwise be caused by the large surges of voltage which result when lightning strikes on or near an outdoor telephone transmission line. The protective apparatus most commonly used for such purposes comprises carbon blocks which are arranged to bypass the high voltage surges to ground. Such carbon blocks are shown, for example, in United States Patent 2,546,824, issued March 27, 1951, to P. P. Koliss, and generally include two carbon elements spaced apart by a short air-gap. This air-gap provides a high impedance to ground at the usual operating line voltages, but a voltage surge having a magnitude in excess of a predetermined level causes breakdown of the gap. The impedance to ground of the carbon block then falls sharply to a very low level and the carbon block serves to bypass the high surge currents. Commonly, the breakdown or voltage for such carbon block protectors is of the order of from 500 to 1000 peak volts.

While, in general, most vacuum tube repeaters and terminal equipment currently in use in telephone systems may be subjected to voltage surges of the order of magnitude of 500 volts without damage, the critical value with respect to comparable transistor circuits is much lower. It may, for example, be as low as 15 or 20 volts. If the numerous advantages of transistor circuits are to be realized in practical telephone systems, means should therefore be provided to bypass all voltage surges on the line which exceed a safe level. By themselves, the carbon block high voltage protectors presently used in telephone systems are inadequate for this purpose since the small gap spacings required would very likely render carbon block protectors designed to break down at 15 or 20 volts impracticable.

An undesirable characteristic of the usual carbon block protectors is encountered when, as is customary, a pair of protectors are connected in series across a balanced transmission line, with a ground connection at the junction point between the two devices. It is difficult to construct a pair of carbon block protectors that will break down at exactly the same instant. If, for example, a pair of carbon block protectors having a nominal rating of 500 volts are connected in series across the line in the manner described, one might have an actual breakdown voltage of 400 volts while the other might have an actual breakdown voltage of 450 volts. If a voltage surge of, for example, 425 volts should appear across the line, only the 400-volt protector would break down and an unbalanced voltage to ground of 425 volts would still be applied to the succeeding apparatus. Even if a much greater surge should appear across the balanced line, there would still be a time lag between the functioning of the two protectors. During the resulting interval, a large transient voltage would pass through to the supposedly protected apparatus.

Recently, semiconductor devices have been discovered which have electrical characteristics making them particularly suitable for use as protective devices for transistor circuits. In general, these devices are p-n junction diodes having, in addition to the usual low resistances in the forward direction, reverse conduction characteristics which include both a region of high resistance (low conductance) for applied voltages below a critical value and a well defined region of substantially constant voltage (high conductance) for applied voltages in excess of the critical level. By way of example, semiconductor devices of this type are described in the article by G. L. Pearson and B. Sawyer, "Silicon p-n junction alloy diodes," appearing at page 1348 of the November 1952 issue of the Proceedings of the I. R. E. Such diodes may be connected across a transmission line to provide over-voltage protection. As long as the line voltage remains below the critical value, the diode provides a high resistance across the line, but as soon as a surge of voltage in excess of the critical value appears, the diode enters its constant voltage region and the resistance across the line drops to a very low value, bypassing the surge current. In the usual arrangement, a pair of oppositely poled diodes is connected in series across the line to provide protection against voltage surges of either polarity.

Semiconductor p–n junction diodes having reverse conduction characteristics with substantially constant voltage regions for applied voltages in excess of a critical value (sometimes called either the zener voltage or the avalanche breakdown voltage) may readily be made to furnish protection against voltages in excess of 15 or 20 volts. They are much faster-acting than are most carbon block protectors and can, in general, be more easily made to have similar breakdown voltages. By themselves, however, diodes designed to breakdown at such low voltages are generally not suitable for use in a telephone system. In the first place, in a practical telephone system, it is often desirable to transmit relatively low frequency (e. g., 20-cycle) ringing voltages over the line in addition to the carrier or voice frequency signal waves. Such voltages are customarily in excess of 15 or 20 volts and would tend to cause a modulation of the signal if they were applied directly to the diode protectors by causing the diodes to present a recurring short across the line. In the second place, open-wire telephone lines are often located in close proximity to power lines and, as a result, power frequency voltages often tend to be induced in the telephone lines. Such power frequency voltages are also frequently of greater magnitude than would be safe to apply to transistor circuits and would have the effect of operating the diode protectors periodically at a rate equal to substantially twice the power frequency. Furthermore, most present p–n junction diodes having the required reverse conduction characteristics have, for power dissipation reasons, only a relatively limited current-carrying capacity. If such diodes were used by themselves to provide high voltage protection for a telephone line, they would breakdown to form substantially a short-circuit across the line as soon as a surge of voltage exceeded the critical value but would be subject to permanent damage if the current through them increased beyond their maximum current-carrying capacity.

The present invention makes it possible to protect any circuits (such as transistor circuits) in a telephone system which are subject to damage even at comparatively low levels of applied voltage without permitting other normal voltages which are only moderately in excess of such levels to interfere with the performance of the system. In its principal aspect, the invention takes the form of a high voltage protection circuit for transistor telephone apparatus which comprises a protective device connected across the transmission line having a breakdown voltage greater than the maximum permissible voltage for the apparatus and a pair of oppositely poled silicon p–n junction diodes connected in series across the terminals of the transistorized equipment having a breakdown voltage equal to or less than the maximum permissible voltage for the apparatus. A resistance proportional to the ratio of the breakdown voltage of the first protective device to the maximum permissible current of the diodes is connected in series between the two stages of protection to limit the current which can pass through the diodes. The first protector (which comprises, in general, one or more carbon block protectors) furnishes primary protection for the repeater or terminal circuits involved but has a sufficiently high breakdown voltage to avoid being operated by higher voltage line signals such as lower frequency ringing potentials or 60 cycle power potentials. The second protector furnishes secondary protection and protects the low dielectric apparatus from any voltages in excess of the maximum permissible voltage level. In addition, the second protector is much faster acting than the first and protects the equipment against any sudden surges of voltage which may have passed through the first protector because of non-simultaneous operation of its elements.

A more complete understanding of the invention may be obtained from the following detailed discussion of several specific embodiments. In the drawings.

Figure 1:
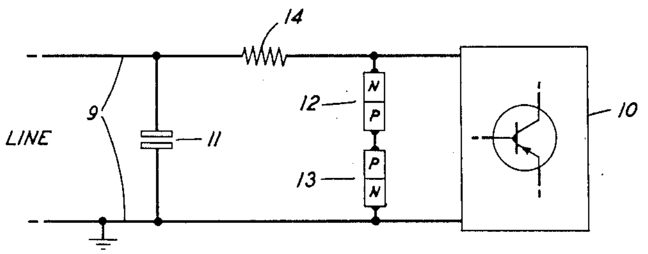
Fig. 1 illustrates a simplified embodiment of the invention.

In the embodiment of the invention shown in Fig. 1, a telephone transmission line 9 supplies either carrier or voice frequency signals to the apparatus 10 for which it is desired to provide protection. Transmission line 9 may, for example, be an open-wire line, while the apparatus 10 may include such items as transistor circuits, which are subject to damage if exposed to voltages in excess of a comparatively low level (e. g., as little as from 15 to 20 volts for some transistor circuits). For simplicity, transmission line 9 in Fig. 1 is shown as unbalanced with respect to ground. Since open-wire telephone lines are more usually balanced with respect to ground, the incoming lines in embodiments of the invention which are described later are so shown.

Primary high voltage protection in the embodiment of the invention illustrated in Fig. 1 is provided by a carbon block protector 11, secondary protection is provided by a pair of p–n junction diodes 12 and 13, and the maximum current which may flow through diodes 12 and 13 before protector 11 operates is limited by a series resistance 14.

As explained previously, the carbon block high voltage protectors commonly used in telephone systems include a pair of carbon elements spaced apart by a short air-gap. The air-gap provides a high impedance across the line at the usual operating line voltages, but a voltage surge in excess of a predetermined level causes breakdown of the gap. The impedance of the carbon block protector then falls sharply to a very low level, and the carbon block forms a bypass path for high surge currents. The designed breakdown voltage for such carbon block protectors is usually of the order of from 500 to 1000 volts.

In the arrangement shown in Fig. 1, carbon block protector 11 is connected directly across transmission line 9. Its breakdown voltage is well in excess of such normal but high (relative to the signal) line voltages such as ringing voltages and induced 60 cycle voltages and thus does not operate merely because of their presence. Modulation of the signal by false operation of the protecting element is thereby avoided. The relatively low frequency ringing and power potentials may be kept from the transistor circuits in the manner which will be described in connection with subsequent embodiments of the invention.

The maximum voltage which may be applied to the protected transistor circuits 10 in Fig. 1 without damage is, however, well below the breakdown voltage of carbon block protector 11. Oppositely poled diodes 12 and 13 are connected in series across the apparatus 10 in order to provide sufficient secondary protection to render the apparatus safe from voltage surges which are passed by the relatively insensitive protector 11. In general, however, diodes 12 and 13 are limited in their current-carrying capacity for power dissipation reasons. Resistance 14 is connected in series in one side of the line between carbon block protector 11 and diodes 12 and 13 to prevent the current flowing through diodes 12 and 13 in their low impedance condition from exceeding this maximum amount. In the embodiment of the invention illustrated in Fig. 1, resistance 14 is substantially equal to the ratio of the breakdown voltage of carbon block protector 11 to the maximum safe current capacity of diodes 12 and 13.

Diodes 12 and 13 are both of the type described in the above-mentioned article by Pearson and Sawyer and each is, in general, a two-terminal rectifying device comprising a body of semiconductive material (silicon) having integral contiguous portions of opposite conductivity types. Each device is, in other words, a two-terminal silicon p-n junction diode.

Figure 2:
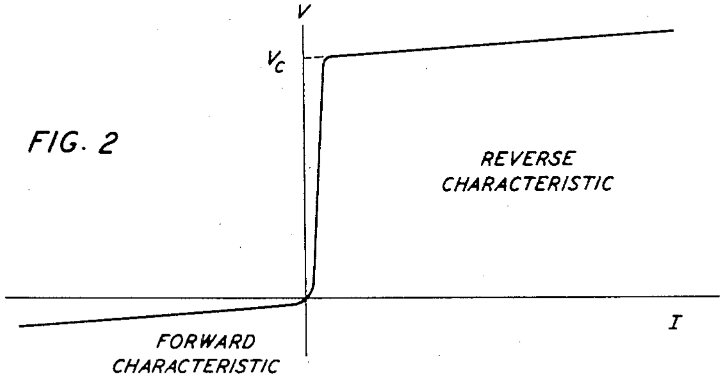
Fig. 2 illustrates the forward and reverse conduction characteristic of a p–n junction diode having a critical voltage level in its reverse characteristic beyond which the device presents a substantially constant very low impedance.

A typical voltage-current characteristic for such a diode is shown in Fig. 2 of the drawings. As illustrated, it resembles those of many rectifying devices in its forward conducting characteristic and in its reverse conducting characteristic for voltages below the critical or avalanche breakdown value $V_c$. The diode has a very low resistance (of an order of magnitude measured in ohms) in the forward direction and a very high resistance (of an order of magnitude measured in megohms) in the reverse direction for applied voltages below $V_c$. For applied voltages in excess of $V_c$, however, the diode is a substantially constant voltage device with a very low resistance (of an order of magnitude measured, once more, in ohms).

At present, silicon appears to be the most useful semiconductive material for achieving a voltage-current characteristic of the type illustrated in Fig. 2. In p-n junction diodes made of such other semiconductive materials as germanium, the reverse conduction characteristic beyond the critical or avalanche breakdown value $V_c$ is different in that the curve tends to droop rather than maintain a substantially constant voltage characteristic. It should be noted, however, that the exact manner of construction of a silicon p-n junction diode is not always of critical importance in producing a voltage-current characteristic like that shown in Fig. 2. For example, some diodes may be constructed by the process known as alloying and others may even be point-contact devices. All of these, however, generally have an internal p-n junction which gives rise to the forward and reverse conduction characteristics illustrated in Fig. 2.

Figure 3:
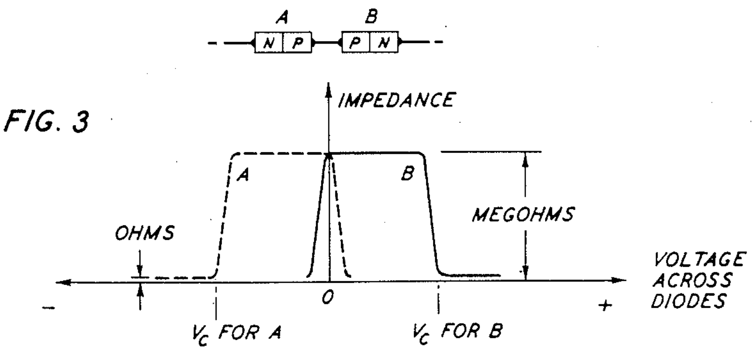
Fig. 3 illustrates the manner in which the impedance presented by a pair of oppositely poled silicon p–n junction diodes connected in series with each other varies with the applied voltage.

The operation of a pair of oppositely pole p-n junction semiconductor diodes connected in series with each other across a line in providing over-voltage protection is illustrated in Fig. 3. At voltages up to the critical or avalanche breakdown value $V_c$, one diode is in its high impedance and the other is in its low impedance state. The diodes thus cooperate to produce substantially an open-circuit impedance across the line for such low voltage levels regardless of the polarity of the voltage. At voltages in excess of the avalanche breakdown voltage $V_c$, however, both diodes are in their low impedance state and substantially a short-circuit is provided across their terminals. In this manner, the diodes limit the voltage which may appear across their terminals and provide an effective by-pass for the surge current regardless of its polarity.

Figure 4:
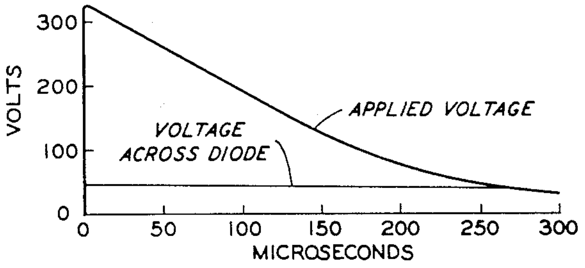
Fig. 4 illustrates the time response characteristic of a silicon p–n junction diode to a voltage impulse.

The extremely fast time response of a silicon p-n junction diode to a large voltage impulse is illustrated by Fig. 4, which shows curves of voltage plotted against time for the voltage applied to the test circuit and for the voltage appearing across the diode under test.

As shown in Fig. 4, for a voltage impulse rising to a value in excess of 300 volts within a small fraction of a microsecond, the response of the diode under test is almost instantaneous. The voltage across the diode 19 immediately rises to the breakdown value (approximately 50 volts for the particular diode represented) and remains there until the applied voltage impulse finally decays and drops below that value. Such diodes are, therefore, sufficiently fast in their response to sudden surges of voltage to protect the succeeding transistor circuits in an over-voltage protection circuit against damage under substantially all circumstances.

Figure 5:
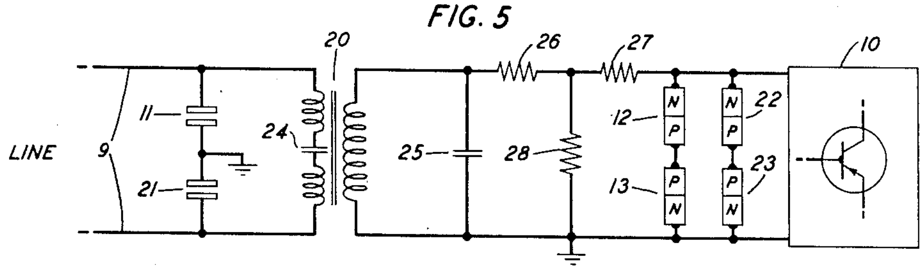
Figs. 5 through 8 illustrate various specific embodiments of the invention.

A specific embodiment of the present invention suitable for use in a telephone system employing transistor circuits is shown in Fig. 5. The embodiment illustrated in Fig. 5 is generally similar to that described in connection with Fig. 1. Transmission line 9, however, is typical of open-wire telephone lines in that it is balanced to ground. In addition, a transformer 20 is provided between the open-wire line and the transistor apparatus 10 which is to be protected in order to convert to a balanced circuit arrangement and to aid in impedance matching.

In order to furnish primary protection in Fig. 5, a pair of carbon block high voltage protectors 11 and 21 are connected from respective sides of the balanced line 9 to ground. These protectors may, for example, have a nominal breakdown voltage of 500 volts. As mentioned above, a transformer 20 is used to couple the balanced line to the unbalanced circuit which it is desired to protect. A capacitor 24 is connected in series between the two halves of the winding on the balanced side of transformer 20 in order to block D.-C. and attenuate ringing voltages (which are commonly 20-cycle voltages) and induced power voltages (which are usually 60-cycle voltages). A small capacitor 25 is connected across the winding on the unbalanced side of transformer 20 in order to attenuate frequency components passing through transformer 20 which are above the signal band. Secondary protection for the transistor circuits which are to be protected is furnished by a pair of oppositely poled p-n junction silicon diodes 12 and 13 connected in series across the unbalanced portion of the line and by another similar pair of oppositely poled diodes 22 and 23 connected across the unbalanced line in parallel with the first pair. The diodes may, for example, have an avalanche breakdown voltage of 18 volts.

A resistance pad in the form of a T network is connected in the unbalanced line between capacitor 25 and the protective diodes. Two resistances 26 and 27 are connected in series in the ungrounded side of the line, and a resistance 28 is connected across the line from the midpoint between resistances 26 and 27 to ground. A principal function of this pad is to limit the current that can flow through the p-n junction diodes in their low impedance condition. Its series resistances 26 and 27 are, therefore, proportional to the ratio of the breakdown voltage of the carbon block protectors 11 and 21 to the maximum current which may be drawn by the diode over-voltage protectors without damage to the diodes. In the embodiment of the invention illustrated in Fig. 5, the proportionality factor is, in general, the impedance ratio of transformer 20.

In the protection circuit of Fig. 5, the second pair of oppositely poled p-n junction silicon diodes 22 and 23 are connected in series across the unbalanced line in parallel with diodes 12 and 13 in order to increase the total maximum current-carrying capacity of the diode portion of the protection circuit. The p-n junction silicon diodes that are most readily available often have a maximum current-carrying capacity below the maximum currents to which they are likely to be subjected. Further increase in the resistance connected in series with the line would tend to attenuate the carrier or voice frequency signals to an undesirable extent. In order to avoid this possible difficulty, the second pair of diodes are connected in parallel with the first across the line to increase the maximum current-handling capacity of the diode portion of the protection circuit. For the specific arrangement shown in Fig. 5, the current-limiting series resistance between transformer 20 and the diodes is governed by the total current-handling capacity of the parallel diode paths rather than by that of either path alone.

As has already been pointed out, a telephone line like the balanced line shown in Fig. 5 normally carries low frequency ringing voltages of greater magnitude than the maximum permissible value for many transistor circuits and is likely, in addition, to carry, at times, induced power frequency voltages which are also in excess of this critical level. In Fig. 5, these are blocked from the transistor apparatus 10 by the series capacitor 24 on the balanced line side of transformer 20. The ringing voltages are normally bypassed around the protected transistor repeater or terminal apparatus 10 by means not shown.

In the operation of the embodiment of the invention illustrated in Fig. 5, higher operating potentials such as ringing peaks on the balanced portion of the line are normally insufficient to operate the carbon protector blocks 11 and 21. Such potentials are prevented from reaching the low-dielectric transistorized equipment 10 by the blocking action of capacitor 24. Extraneous surges on the line, however, generally contain frequency components that are not effectively blocked by capacitor 24 and pass through transformer 20. Such voltages are limited to safe values by the diode protector arrangement. Even when the carbon protector blocks 11 and 21 operate, the voltage drop across them is still sufficiently large to damage transistorized equipment if secondary protection is not employed in this manner.

Since ringing and power voltages are kept from diodes 12, 13, 22, and 23 by blocking capacitor 24, the carrier or voice frequency signals normally pass on through transformer 20 to the protected transistor circuits uninterrupted. However, as pointed out above, when an extraneous surge of voltage appears on the line, it often contains frequency components too high to be blocked by capacitor 24. If the magnitude of the impulse is great enough, both blocks 11 and 21 operate. If it is not, those components of the impulse in the signal band are applied through the resistance pad to diodes 12, 13, 22, and 23, while most components above the signal band in frequency are attenuated by shunt capacitor 25. The components of the impulse reaching the diodes bias either diodes 12 and 22 or diodes 13 and 23 (depending upon the polarity of the impulse) beyond their avalanche breakdown points and are bypassed to ground. In this manner, the transistor apparatus 10 is furnished protection which neither carbon block high voltage protectors 11 or 21 nor p-n junction semiconductor diodes 12, 13, 22, and 23 could furnish alone. Voltage surges of the order of magnitude of 500 volts are bypassed to ground by carbon block protectors 11 and 21, while voltage surges lower in magnitude but in excess of 18 volts are bypassed to ground by the semiconductor diodes. The diodes, which have a relatively small current-carrying capacity in comparison with the carbon blocks, are themselves protected from destruction by the current-limiting action provided by series resistances 26 and 27 and carbon protector blocks 11 and 21.

In the embodiment of the invention shown in Fig. 5, protection is also provided against the tendency of carbon block protectors 11 and 21 not to break down simultaneously. As has already been pointed out, a pair of carbon block high voltage protectors having a nominal breakdown voltage of 500 volts may have actual breakdown voltages of the order of 400 and 450 volts, respectively. If, for example, a surge of 425 volts should appear on the incoming line, one carbon block protector would break down but the other would not. An unbalanced voltage to ground of 425 volts would remain across the primary side of transformer 20 and would be transmitted to the protected apparatus 10 if it were not for the presence of the junction diodes 12, 13, 22, and 23. In addition, even if a surge of more than 450 volts should appear in the incoming line, there would be a time lag between the functioning of the two carbon block protectors. During the time interval between the breakdown of the two blocks, a large transient voltage would pass through transformer 20. Any such voltage surge is effectively limited by diodes 12, 13, 22, and 23.

The above values for actual operating voltages for carbon protector blocks are given by way of example. Actually, the problem can be more severe than would appear from these figures, since in a factory run of blocks having a nominal gap of 0.028 inch the average breakdown is 425 peak volts but the range is from about 350 to nearly 600 peak volts.

While the double protection circuit of Fig. 5 is shown with two pairs of junction diodes, it should be remembered that a single pair will suffice in many circumstances. For example, when the maximum current-carrying capacity of one pair is sufficient, there is generally no need for the second pair.

Figure 6:
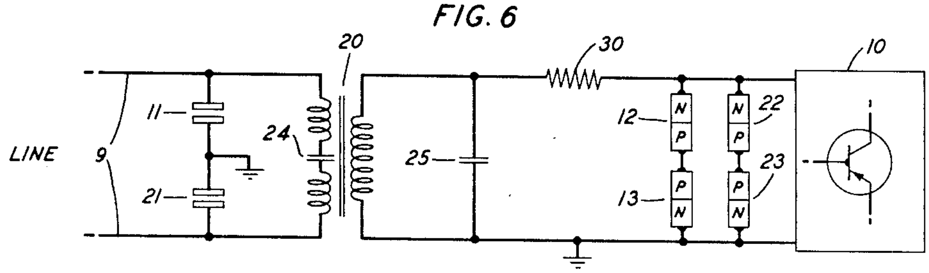

Fig. 6 shows an embodiment of the invention which is generally similar to the one illustrated in Fig. 5. It differs in that a single series resistance 30 is used instead of the resistance pad to limit the current which can flow in diodes 12, 13, 22, and 23 in their low impedance condition. The Fig. 6 arrangement is the simpler of the two arrangements and, for that reason, tends to be preferable when the prevention of reflections is not a serious consideration.

Figure 7:
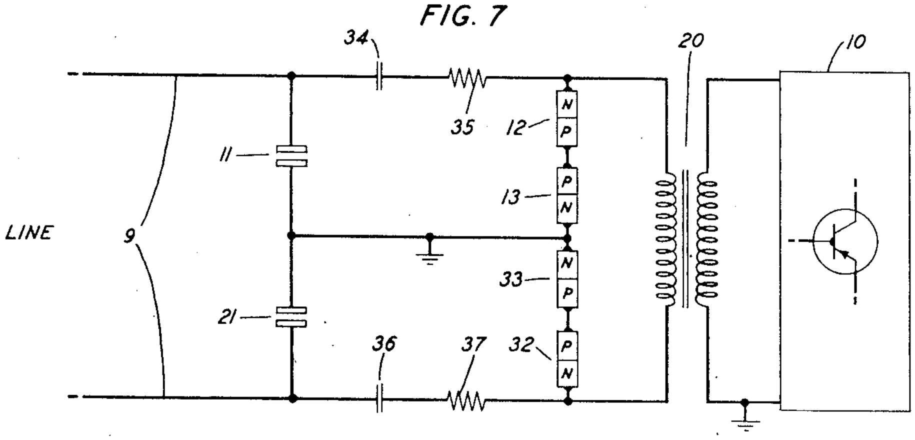
Figure 8:
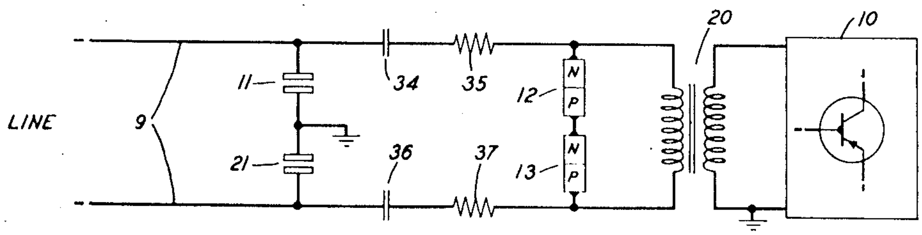

Two further embodiments of the invention suitable for use in protecting transistor telephone circuits from large surges of voltages appearing on transmission line 9 are illustrated in Figs. 7 and 8. Both are generally similar in their operation to the embodiments which have already been described but, in addition, provide over-voltage protection to transformer 20 as well as to the transistor circuits 10. While neither protective circuit is shown with parallel diode paths of the type shown in Figs. 5 and 6, it is to be understood that such additional paths may be provided if the maximum current-carrying capacity of a single path is insufficient.

In Fig. 7, the carbon block protectors 11 and 21 are connected between respective sides of the balanced incoming telephone line 9 and ground. A blocking capacitor 34 for ringing voltages and a current-limiting resistance 35 are connected in series in one side of the line, and a similar blocking capacitor 36 and current-limiting resistance 37 are connected in series in the other side of the line between carbon block protectors 11 and 21 and transformer 20. Capacitors 34 and 36 block ringing voltages, which are bypassed around the transistor circuits by means not shown, while resistances 35 and 37 limit the current which can flow in the p–n junction diode paths in the protection circuit. A pair of oppositely poled silicon p–n junction diodes 12 and 13 are connected in series from the junction between resistance 35 and transformer 20 to ground, while another similar pair of diodes 32 and 33 are connected in series from the junction between resistance 37 and transformer 20 to ground.

The embodiment of the invention shown in Fig. 7 not only protects the transistor circuits 10 on the unbalanced side of transformer 20 but also, as stated above, protects transformer 20 itself. It protects both against excess voltages across the respective windings and against excess winding-to-winding voltages. This latter end is accomplished by the action of diodes 12, 13, 32, and 33 in providing a path to ground for extraneous currents rather than merely from one side of the primary winding of transformer 20 to the other.

The embodiment of the invention illustrated in Fig. 8 sacrifices the winding-to-winding protection of the one shown in Fig. 7 but requires only half as many diodes. In general, winding-to-winding over-voltage protection is less important than across-the-winding protection for the reason that most transformers are more easily made insensitive to the former than to the latter. The protective circuit illustrated in Fig. 8 retains, however, the across-the-winding protection of Fig. 7. Other than requiring only half as many diodes, the circuit shown in Fig. 8 has the advantage that the diodes that are used are not subject to voltages to ground. As a result, the diode requirements with this circuit are less severe.

The actual circuit arrangement in Fig. 8 is the same as that in Fig. 7 except that the diode portion of the circuit comprises only a single pair of oppositely poled silicon p–n junction diodes connected in series directly across the balanced side of transformer 20.

Finally, it should be pointed out that while the diode paths that have been described are illustrated as being composed of two separate diodes connected back-to-back, those diodes may actually be combined in a single structure. An n–p–n double diode arrangement would be a typical example. Basically, however, such a structure would still constitute a pair of series-connected oppositely-poled diodes.

It is to be understood that the above-described arrangements are illustrative of the application of the principles of the invention. Numerous other arrangements may be devised by those skilled in the art without departing from the spirit and scope of the invention.

What is claimed is:

1. In a signal transmission system which includes a transmission line connected to supply signal energy to wave translation apparatus subject to damage by applied voltages in excess of a predetermined value, at least one primary high voltage protector connected across said line having a breakdown voltage greater than said predetermined value, at least one pair of oppositely poled p-n junction semiconductor diodes connected in series across the portion of said line between said primary high voltage protector and said wave translation apparatus, each of said diodes having a predetermined maximum current-carrying capacity and a substantially constant voltage region in its reverse conduction characteristic for applied voltages in excess of a critical value, said critical value being no greater than said predetermined value of voltage which may safely be applied to said wave translation apparatus, and a resistance connected in series in said line between said primary high voltage protector and said diodes to limit the current flowing in said diodes when the voltage applied thereto exceeds said critical value to a value within said maximum current-carrying capacity, said resistance being proportional to the ratio of the breakdown voltage of said primary high voltage protector to the maximum current-carrying capacity of the path across said line formed by said diodes.

2. In a signal transmission system which includes a transmission line connected to supply signal energy to wave translation apparatus subject to damage by applied voltages in excess of a predetermined value, at least one carbon block high voltage protector connected across said line having a breakdown voltage greater than said predetermined value, at least one pair of oppositely poled silicon p-n junction diodes connected in series across the portion of said line between said carbon block protector and said wave translation apparatus, each of said diodes having a predetermined maximum current-carrying capacity and a substantially constant voltage region in its reverse conduction characteristic for applied voltages in excess of a critical value, said critical value being no greater than said predetermined value of voltage which may safely be applied to said wave translation apparatus, and a resistance connected in series in said line between said carbon block protector and said diodes to limit the current flowing in said diodes when the voltage applied thereto exceeds said critical value to a value within said maximum current-carrying capacity, said resistance being proportional to the ratio of the breakdown voltage of said carbon block protector to the maximum current-carrying capacity of the path across said line formed by said diodes.

3. In a signal transmission system which includes a balanced transmission line connected to supply signal energy to transistor circuits subject to damage by applied voltages in excess of a predetermined value, a pair of primary high voltage protectors each connected between a respective side of said balanced line and ground, each of said primary high voltage protectors having a breakdown voltage greater than said predetermined value, at least one pair of secondary high voltage protectors in the form of a pair of oppositely poled p-n junction semiconductor diodes connected in series across the portion of said line between said primary high voltage protectors and said transistor circuits, each of said diodes having a predetermined maximum current-carrying capacity and a low impedance forward conduction characteristic, a high impedance reverse conduction characteristic for reverse voltages below a critical value, and a substantially constant voltage characteristic for reverse voltages above said critical value, said critical value being equal to or less than said predetermined value of voltage which may safely be applied to said transistor circuits, and a resistance connected in series in said line between said primary high voltage protectors and said diodes proportional to the ratio of the breakdown voltage of said primary high voltage protectors to the maximum current-carrying capacity of the path across said line formed by said diodes, whereby said transistor circuits are protected against damage even if said pair of primary high voltage protectors should fail to operate simultaneously and the current flowing through said diodes while one of them is operating in the constant voltage portion of its reverse conduction characteristic is limited to a value below their maximum current-carrying capacity.

4. In a signal transmission system which includes a balanced transmission line connected to supply signal energy to transistor circuits subject to damage by applied voltages in excess of a predetermined value, said transistor circuits being unbalanced with respect to ground, a pair of primary high voltage protectors each connected between a respective side of said balanced line and ground, each of said primary high voltage protectors having a breakdown voltage greater than said predetermined value, a balanced-to-unbalanced transformer connected between said balanced line and said transistor circuits, an unbalanced transmission line interconnecting the unbalanced side of said transformer and said transistor circuits, at least one pair of secondary high voltage protectors in the form of a pair of oppositely poled p-n junction semiconductor diodes connected in series across said unbalanced line, each of said diodes having a predetermined maximum current-carrying capacity and a substantially constant voltage region in its reverse conduction characteristic for applied voltages in excess of a critical value, said critical value being equal to or less than said predetermined value of voltage which may safely be applied to said transistor circuits, and a resistance connected in series in said unbalanced line between the unbalanced side of said transformer and said diodes proportional to the ratio of the breakdown voltage of said primary high voltage protectors to the maximum current-carrying capacity of the path across said unbalanced line formed by said diodes, whereby said transistor circuits are protected against damage even if said pair of primary high voltage protectors should fail to operate simultaneously and the current flowing through said diodes while one of them is operating in the constant voltage portion of its reverse conduction characteristic is limited to a value below their maximum current-carrying capacity.

5. In a telephone system which includes a balanced transmission line connected to supply signal energy to transistor circuits subject to damage by applied voltages in excess of a predetermined value, said balanced line sometimes also carrying voltages such as ringing voltages and induced power voltages having a magnitude moderately in excess of said predetermined value and said transistor circuits being unbalanced with respect to ground, a pair of primary high voltage protectors each connected between a respective side of said balanced line and ground, each of said primary high voltage protectors having a breakdown voltage greater than said predetermined value, a balanced-to-unbalanced transformer connected between said balanced line and said transistor circuits, an unbalanced transmission line interconnecting the unbalanced side of said transformer and said transistor circuits, at least one capacitor connected in series with the balanced side of said transformer to block the transmission of voltages having frequencies below the telephone signal band, at least one capacitor connected across the unbalanced side of said transformer to attenuate transmitted voltages having frequencies above the telephone signal band, at least one pair of secondary high voltage protectors in the form of a pair of oppositely poled p-n junction semiconductor diodes connected in series across said unbalanced line, each of said diodes having a predetermined maximum current-carrying capacity and a substantially constant voltage region in its reverse conduction characteristic for applied voltages in excess of a critical value, said critical value being equal to or less than said predetermined value of voltage which may safely be applied to said transistor circuits, and a resistance connected in series in said unbalanced line between the unbalanced side of said transformer and said diodes proportional to the ratio of the breakdown voltage of said primary high voltage protectors to the maximum current-carrying capacity of the path across said unbalanced line formed by said diodes, whereby said transistor circuits are protected against damage even if a voltage surge should be insufficient to operate said primary high voltage protectors or said pair of primary high voltage protectors should fail to operate simultaneously, said voltages on said balanced line only moderately in excess of said predetermined value are blocked from said diodes, and said diodes are protected from currents in excess of their maximum current-carrying capacity.

6. In a signal transmission system which includes a balanced transmission line connected to supply signal energy to transistor circuits subject to damage by applied voltages in excess of a predetermined value, a pair of carbon block high voltage protectors each connected between a respective side of said line and ground, each of said carbon block protectors having a breakdown voltage greater than said predetermined value, a transformer interconnecting said balanced line and said transistor circuits, at least one pair of oppositely poled p-n junction semiconductor diodes connected in series across the portion of said balanced line between said carbon block protectors and said transformer, each of said diodes having a predetermined maximum current-carrying capacity and a substantially constant voltage region in its reverse conduction characteristic for applied voltages in excess of a critical value, said critical value being proportional to said predetermined value of voltage which may safely be applied to said transistor circuits, and a pair of resistances connected in series in respective sides of said balanced line between said carbon block protectors and said diodes, said resistances being proportional to the ratio of the breakdown voltage of said carbon block protectors to the maximum current-carrying capacity of the path formed by said diodes, whereby both said transistor circuits and said transformer are protected against damage even if a voltage surge should be insufficient to operate said carbon block protectors or said pair of carbon block protectors should fail to operate simultaneously and said diodes are protected from currents in excess of their maximum current-carrying capacity.

References Cited in the file of this patent

UNITED STATES PATENTS

| | | |
|---|---|---|
| 1,303,383 | Osborne | May 13, 1919 |
| 1,573,068 | Honaman | Feb. 16, 1926 |
| 1,745,690 | Pritchett | Feb. 4, 1930 |
| 2,341,932 | MacCarthy | Feb. 15, 1944 |
| 2,538,177 | Vigren | Jan. 16, 1951 |
| 2,669,635 | Pfann | Feb. 16, 1954 |

FOREIGN PATENTS

| | | |
|---|---|---|
| 551,443 | Great Britain | Feb. 25, 1943 |